United States Patent
Im et al.

(10) Patent No.: US 10,235,879 B2
(45) Date of Patent: Mar. 19, 2019

(54) NOTIFICATION SYSTEM OF A CAR AND METHOD OF CONTROLLING THEREFOR

(71) Applicant: LG ELECTRONICS INC., Seoul (KR)

(72) Inventors: Hyeongjin Im, Seoul (KR); Saekyu Park, Seoul (KR); Eunju Lee, Seoul (KR); Byeongki Kang, Seoul (KR); Seijun Lim, Seoul (KR); Chulbae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 15/115,359

(22) PCT Filed: Aug. 25, 2015

(86) PCT No.: PCT/KR2015/008826
§ 371 (c)(1),
(2) Date: Jul. 29, 2016

(87) PCT Pub. No.: WO2016/186255
PCT Pub. Date: Nov. 24, 2016

(65) Prior Publication Data
US 2018/0174450 A1     Jun. 21, 2018

Related U.S. Application Data

(60) Provisional application No. 62/162,825, filed on May 18, 2015.

(51) Int. Cl.
*G08G 1/0962* (2006.01)
*B60Q 1/50* (2006.01)
(Continued)

(52) U.S. Cl.
CPC .......... *G08G 1/0962* (2013.01); *B60K 35/00* (2013.01); *B60Q 1/50* (2013.01); *B60Q 1/525* (2013.01);
(Continued)

(58) Field of Classification Search
USPC ....................................... 701/301
See application file for complete search history.

(56) References Cited

U.S. PATENT DOCUMENTS

| | | | |
|---|---|---|---|
| 7,377,675 B2 | 5/2008 | Pastrick et al. | |
| 8,963,701 B2 * | 2/2015 | Rodriguez Barros | . B60Q 1/323 340/438 |

(Continued)

FOREIGN PATENT DOCUMENTS

| | | |
|---|---|---|
| KR | 10-2013-0085792 | 7/2013 |
| KR | 10-2014-0050472 | 4/2014 |

(Continued)

*Primary Examiner* — Tyler D Paige
(74) *Attorney, Agent, or Firm* — Fish & Richardson P.C.

(57) ABSTRACT

A notification system of a vehicle includes a sensing unit that detects an object outside the vehicle or detects an operational status of a function of the vehicle; an output unit; and a controller. The controller is configured to determine whether a touch has been detected on an interior handle of a door of the vehicle. If a touch is detected on the interior handle, the controller determines that an object outside the vehicle detected by the sensor is within a predetermined distance in a rearward direction from the door on which the touch was detected, or determines that an operational status of a function of the vehicle detected by the sensor indicates that the function is not yet complete; and controls the output unit to output a notification corresponding to the detected object outside the vehicle or the detected operational status of the function of the vehicle.

16 Claims, 10 Drawing Sheets

(51) Int. Cl.
*B60K 35/00* (2006.01)
*G08G 1/01* (2006.01)
*G08G 1/16* (2006.01)
*B60Q 1/52* (2006.01)

(52) U.S. Cl.
CPC ............ *G08G 1/0112* (2013.01); *G08G 1/16* (2013.01); *G08G 1/166* (2013.01); *B60Q 2400/50* (2013.01)

(56) References Cited

U.S. PATENT DOCUMENTS

| | | | |
|---|---|---|---|
| 2007/0014439 A1* | 1/2007 | Ando | G06K 9/00771 382/118 |
| 2011/0260848 A1* | 10/2011 | Rodriguez Barros | B60Q 1/2665 340/438 |
| 2012/0056734 A1* | 3/2012 | Ikeda | G08G 1/165 340/425.5 |
| 2012/0194356 A1* | 8/2012 | Haines | G08G 1/161 340/933 |
| 2012/0217764 A1* | 8/2012 | Ishiguro | B60R 1/00 296/1.07 |
| 2013/0113614 A1 | 5/2013 | Yopp | |

FOREIGN PATENT DOCUMENTS

| | | |
|---|---|---|
| KR | 10-1479065 | 1/2015 |
| KR | 10-1485044 | 1/2015 |

\* cited by examiner

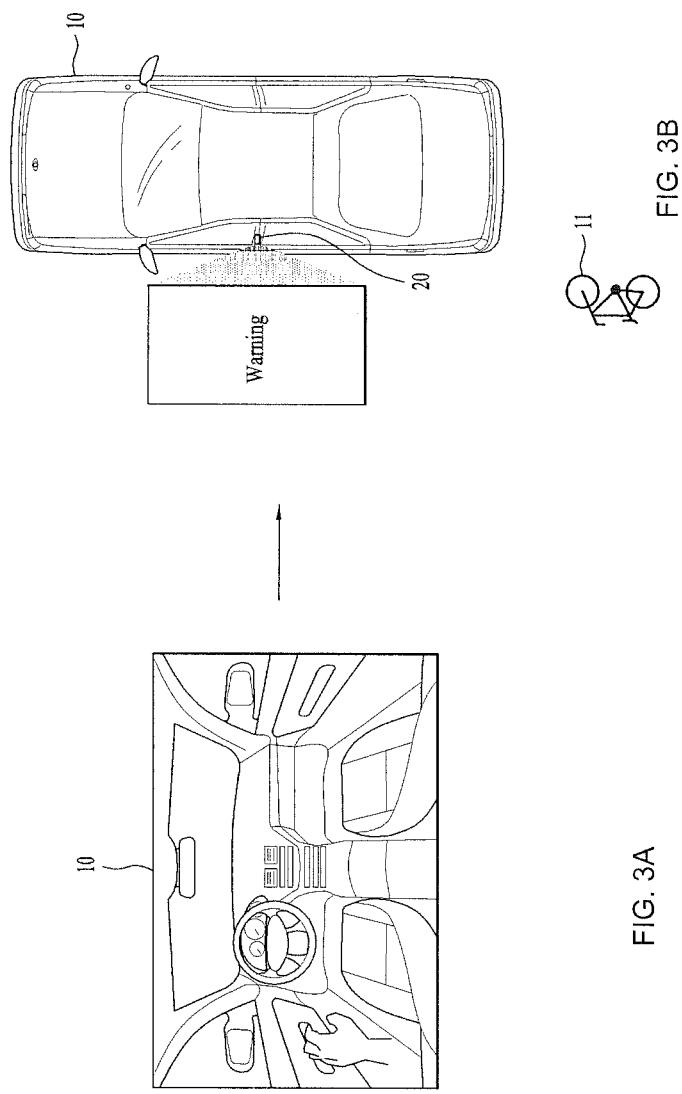

NOTIFICATION SYSTEM OF A CAR AND METHOD OF CONTROLLING THEREFOR

CROSS REFERENCE TO RELATED APPLICATIONS

This application is a U.S. National Phase Application under 35 U.S.C. § 371 of International Application PCT/KR2015/008826, filed on Aug. 24, 2015, which claims the benefit of U.S. Provisional Application No. 62/162,825, filed on May 18, 2015, the entire contents of which are hereby incorporated by reference in their entireties.

TECHNICAL FIELD

The present invention relates to a notification system of a car and a method of controlling therefor.

BACKGROUND ART

People are using a car to move a long distance. With the help of technological advancement, such a function as a safety function, a convenient function, and the like as well as a transportation function have been included in a car. For example, an air conditioner, a camera and various sensors have been installed in a car. The camera mounted on the car captures a surrounding object of the car and a captured image can be seen to a driver through an internal display of the car. The various sensors installed in the car sense a surrounding object of the car and a sensed signal can be outputted to the driver through an internal output device of the car. A safety device of the car senses an external signal and may be able to give caution to the driver.

Meanwhile, a person passing by a car may not recognize a start of the car or a driver getting out of the car. If the person passing by the car fails to recognize danger, it is highly probable for the person to meet with an accident. Hence, it is necessary to have a technology capable of giving caution to a person who is passing by a car.

DISCLOSURE OF THE INVENTION

Technical Problem

An object of the present invention is to solve the aforementioned problem and other problems. Another object of the present invention is to provide a notification system of a car capable of sensing an object existing within a predetermined distance from the car or an uncompleted function and outputting a notification message corresponding to the sensed external object or the sensed uncompleted function and a method of controlling therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a notification system of a car includes a sensing unit, if a touch on a handle of a door is sensed, configured to sense an object existing within a predetermined distance in rear direction from the door on which the touch is sensed or an uncompleted function, an output unit configured to output a notification message corresponding to the sensed object or the sensed uncompleted function and a controller configured to control the sensing unit and the output unit.

And, if the object existing within the predetermined distance is sensed, the controller can control the output unit to output the notification message to an external floor of a door of a direction at which the object is positioned.

Meanwhile, the notification message car include at least one selected from the group consisting of a warning text, a warning image and a guideline.

And, the controller can control at least one of a flickering speed of the notification message and a color of the notification message based on a distance with the object.

And, the output unit includes a warning light deployed in the inside of a door or a pillar of the car. If the object existing within the predetermined distance is sensed, the controller can turn on the warning light which is deployed in a position closest to the door on which the touch is sensed.

And, if the uncompleted function is sensed, the controller can control the output unit to output the notification message to a window of the door on which the touch is sensed.

And, if the uncompleted function is sensed and a user getting out of the car is sensed, the controller can control the output unit to output the notification message to an external floor of a door of a direction at which the user is getting out.

Meanwhile, the notification message can include at least one of type information of the uncompleted function and location information.

And, the uncompleted function can include at least one selected from the group consisting of a lighting function, a door lock function and a window opening/closing function.

Meanwhile, the notification system of the car can further include a communication unit configured to receive a position checking signal. In this case, the controller can control the output unit to output the notification message to a ceiling direction in response to the received position checking signal.

And, the notification message can include at least one selected from the group consisting of emblem of the car, a number of the car, a text configured by a user and an image configured by the user.

Meanwhile, the notification system of the car can further include an input unit configured to receive an input for an output command of an emergency signal. In this case, if the input for the output command of the emergency signal is received, the controller can control the output unit to output a notification message corresponding to the emergency signal.

And, the controller can control the output unit to output the notification message to a rear window of the car or a rear floor of the car.

And, the controller can output the notification message to a rear floor of the car. In this case, if an object approaching from the back of the car exists, the controller can adjust an output position and a length of the notification message based on a distance and a moving speed of the approaching object to make the approaching object recognize the notification message.

The output unit can include a MEMS projector.

The output unit can rotate.

To further achieve these and other advantages and in accordance with the purpose of the present invention, according to a different embodiment, a method of controlling a notification system of a car can include the steps of, if a touch on a handle of a door is sensed, sensing an object existing within a predetermined distance in rear direction from the door on which the touch is sensed or an uncompleted function and outputting a notification message corresponding to the sensed object or the sensed uncompleted function.

Advantageous Effects

Advantageous effects of a user equipment according to the present invention and a method of controlling therefor are described in the following.

According to at least one embodiment of the present invention, it is able to give caution to persons passing by a car.

According to at least one embodiment of the present invention, it is able to warn a user about an uncompleted function.

According to at least one embodiment of the present invention, it is able to inform a user of a position, a characteristic or a status of a car.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIGS. 3A and 3B are diagrams for explaining one embodiment of outputting a notification message;

BEST MODE

Mode for Invention

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1A:
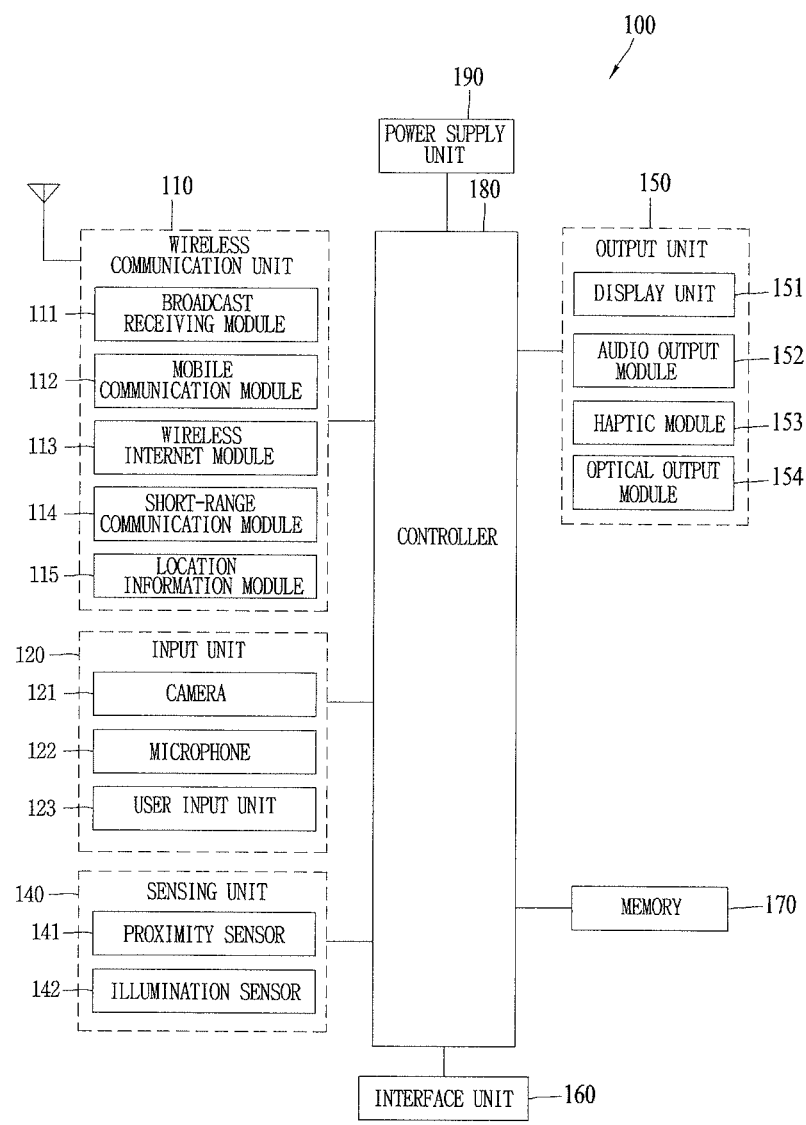
FIG. 1A is a diagram for explaining a user equipment according to the present invention.

Referring to FIG. 1A, FIG. 1A is a block diagram for explaining a user equipment according to the present invention.

The user equipment 100 can include a wireless communication unit 110, an input unit 120, a sensing unit 140, an output unit 150, an interface unit 160, a memory 170, a controller 180, and a power supply unit 190. Since implementing all of the components illustrated in FIG. 1A is not a requirement, the user equipment described in the present specification may have greater or fewer components compared to the aforementioned components.

More specifically, the wireless communication unit 110 can include one or more modules which permit communications such as wireless communications between the user equipment 100 and a wireless communication system, communications between the user equipment 100 and another user equipment, communications between the user equipment 100 and an external server. Further, the wireless communication unit 110 can include one or more modules configured to connect the user equipment 100 to one or more networks.

To facilitate such communications, the wireless communication unit 110 can include at least one selected from the group consisting of a broadcast receiving module 111, a mobile communication module 112, a wireless Internet module 113, a short-range communication module 114, and a location information module 115.

The input unit 120 can include a camera 121 or an image input unit for inputting an image signal, a microphone 122 or an audio input unit for inputting an audio signal, and a user input unit 123 for receiving an input from a user (for example, a touch key, a push key, and the like). Audio data and image data obtained by the input unit 120 are analyzed and the analyzed data can be processed by a user command.

The sensing unit 140 can include one or more sensors to sense at least one selected from the group consisting of internal information of a user equipment, surrounding environment information of the user equipment and user information. For example, the sensing unit 140 can include at least one selected from the group consisting of a proximity sensor 141, an illumination sensor 142, touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, and the like), and a chemical sensor (for example, an electronic nose, a health care sensor, a biometric sensor, and the like). Meanwhile, the user equipment described in the present specification can utilize information obtained from two or more sensors among the aforementioned sensors in a manner of combining the information with each other.

The output unit 150 is typically configured to output various types of information, such as audio, video, tactile output, and the like. The output unit 150 can include at least one selected from the group consisting of a display unit 151, an audio output unit 152, a haptic module 153, and an optical output unit 154. The display unit 151 may have an interlayered structure or an integrated structure with a touch sensor to implement a touch screen. The touch screen may provide an output interface between the user equipment 100 and a user, as well as function as the user input unit 123 which provides an input interface between the user equipment 100 and the user.

The interface unit 160 plays a role of a path with various types of external devices connected with the user equipment 100. The interface unit 160 can include at least one selected from the group consisting of a wired or wireless headset port, an external charger port, a wired or wireless data port, a memory card port, a port for connecting a device on which an identification module is mounted, an audio input/output (I/O) port, a video I/O port, an earphone port. The user equipment 100 may perform appropriate control functions associated with a connected external device in response to the external device connected with the interface unit 160.

The memory 170 is configured to store data to support various functions of the user equipment 100. For instance, the memory 170 can store a plurality of application programs executed in the user equipment 100, data and instructions for operations of the user equipment 100. Some of these application programs may be downloaded from an external server via wireless communication. Other application programs may be installed in the user equipment 100 at the time of manufacturing the user equipment for basic functions (for example, receiving a call, making a call, receiving a message, and sending a message) of the user equipment 100. Meanwhile, an application program is stored in the memory 170 and installed in the user equipment 100 to make the controller 180 perform an operation (or function) of the user equipment 100.

The controller 180 controls overall operation of the user equipment 100 in addition to the operations associated with the application programs. The controller 180 processes signals, data, informations and the like inputted or outputted through the above-mentioned components and/or runs application programs stored in the memory 170 to process or provide a user with appropriate informations or functions.

The controller 180 can control at least a part of the components illustrated in FIG. 1A to execute an application program stored in the memory 170. Moreover, the controller 180 can operate two or more components included in the user equipment 100 in a manner of combining the components with each other to execute the application program.

The power supply unit 190 can receive external power or internal power under the control of the controller 180 and supply appropriate power to each of the components included in the user equipment 100. The power supply unit 190 may include a battery and the battery may be configured to be embedded in the user equipment, or configured to be detachable from the user equipment.

At least one portion of the respective components mentioned in the foregoing description can cooperatively operate to implement operations, controls or controlling methods of the user equipment according to various embodiments of the present invention mentioned in the following description. Moreover, the operations, controls or controlling methods of the user equipment can be implemented in the user equipment by running at least one or more application programs stored in the memory 170.

In the following, prior to explaining the various embodiments implemented by the aforementioned user equipment 100, the aforementioned components are explained in more detail with reference to FIG. 1A.

First of all, the wireless communication unit 110 is explained. The broadcast receiving module 111 of the wireless communication unit 110 is configured to receive a broadcast signal and/or broadcast associated information from an external broadcast management server via a broadcast channel. The broadcast channel may include a satellite channel, a terrestrial channel, or both. Two or more broadcast receiving modules can be provided to the user equipment 100 to enable the user equipment to receive two or more broadcast channels at the same time or switch a broadcast channel among the channels.

The mobile communication module 112 can transceive a radio signal with at least one selected from the group consisting of a base station, an external user equipment and a server in a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like).

The radio signal can include audio call signals, video call signals, or various formats of data according to text message/multimedia message transmission and reception.

The wireless Internet module 113 corresponds to a module for wireless Internet access. This module may be internally or externally installed in the user equipment 100. The wireless Internet module 113 can be configured to transmit and receive a radio signal in a communication network according to wireless Internet technologies.

Examples of the wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of wireless Internet technologies including Internet technology, which is not listed on the aforementioned technologies.

In some cases, in the aspect that the wireless Internet access according to WiBro, HSDPA, HSUPA, GSM, CDMA, WCDMA, LTE, LTE-A and the like is implemented via a mobile communication network, the wireless Internet module 113 performing the wireless Internet access via the mobile communication network may be regarded as a kind of the mobile communication module 112.

The short-range communication module 114 is configured to perform short-range communications. The short-range communication module 114 can support the short-range communication using at least one selected from the group consisting of Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless USB(Wireless Universal Serial Bus). The short-range communication module 114 can support wireless communications between the user equipment 100 and a wireless communication system, communications between the user equipment 100 and another user equipment 100 (or an external server), or wireless communications between the user equipment 100 and a network at which another user equipment 100 (or an external server) is located via a short-range wireless communication network (wireless area networks). The short-range wireless communication network may correspond to a short-range wireless personal communication network (wireless personal area networks).

In this case, another user equipment 100 may correspond to a wearable device (e.g., a smart watch, a smart glass, a HMD (head mounted display)) capable of exchanging data (capable of being interlocked) with the user equipment 100 according to the present invention. The short-range communication module 114 may sense or recognize a wearable device capable of communicating with the user equipment 100 in the vicinity of the user equipment 100. In addition, when the sensed wearable device is a device which is authenticated to communicate with the user equipment 100, the controller 180 can transmit a part of data processed in the user equipment 100 to the wearable device via the short-range communication module 114. Hence, a user of the wearable device may use the data processed in the user equipment 100 on the wearable device. For example, when a call is received in the user equipment 100, the user may answer the call using the wearable device. Also, when a message is received in the user equipment 100, the user can check the received message using the wearable device.

The location information module 115 is configured to obtain a position (or a current position) of the user equipment. As a representative example of the location information module 115, there is a Global Position System (GPS) module or a Wi-Fi module. For example, if the GPS module is utilized, the user equipment is able to obtain a position of the user equipment using a signal transmitted from a GPS satellite. As a different example, if the Wi-Fi module is utilized, the user equipment can obtain a position of the user equipment based on information of a wireless AP (access point) configured to transceive a radio signal with the Wi-Fi module. If necessary, the location information module 115 may alternatively or additionally perform a function of a different module of the wireless communication unit 110 to obtain data related to the position of the user equipment. Since the location information module 115 corresponds to a module for obtaining a position (or a current position) of the user equipment, the location information module 115 may be non-limited by a module for directly calculating or obtaining a position of the user equipment.

The input unit 120 may be configured to input image information (signal), audio information (signal), data or information inputted from a user. In order to input the image information, the user equipment 100 can include a camera or a plurality of cameras 121. The cameras 121 may process such an image frame as a still image or a video obtained by an image sensor in an image calling mode or a capturing mode. The processed image frame can be displayed on the display unit 151 or stored in memory 170. Meanwhile, a plurality of the cameras 121 mounted on the user equipment 100 may be arranged in a matrix structure to make a plurality of image information having various angles or focal points to be inputted into the user equipment 100. As another example, a plurality of the cameras 121 may be arranged in a stereoscopic structure to acquire a left image and a right image for implementing a stereoscopic image.

The microphone 122 is configured to convert an external audio signal into electronic voice data. The processed voice data can be variously utilized according to a function (or an application program executed by the user equipment) performed by the user equipment 100. Meanwhile, the microphone 122 may be able to implement various noise removing algorithms to remove unwanted noise generated in the course of receiving the external audio signal.

The user input unit 123 is configured to receive an input from a user. If information is inputted via the user input unit 123, the controller 180 can control an operation of the user equipment 100 to make the operation correspond to the inputted information. The user input unit 123 may include a mechanical input means (or a mechanical input key) (for example, a button located on a front and/or rear surface or a side surface of the user equipment 100, a dome switch, a jog wheel, a jog switch, and the like) and a touch input means. As an example, the touch input means may correspond to a virtual key, a soft key, or a visual key displayed on a touch screen through software processing, or a touch key located at a part other than the touch screen. Meanwhile, the virtual key or the visual key can be displayed on the touch screen in various shapes, for example, graphic, text, icon, video, or a combination thereof.

Meanwhile, the sensing unit 140 is generally configured to sense at least one of information on surrounding environment of the user equipment and user information and generate a sensing signal corresponding to the information. The controller 180 controls operation of the user equipment 100 or performs data processing, a function or an operation associated with an application program installed in the user equipment based on the sensing signal. Representative sensors among various sensors capable of being included in the sensing unit 140 are explained in detail in the following.

First of all, the proximity sensor 141 corresponds to a sensor configured to sense whether or not there is an object approaching a prescribed sensing surface or an object near the prescribed sensing surface using an electromagnetic field, infrared rays, or the like without a mechanical contact. The proximity sensor 141 may be arranged at an inner region of the user equipment covered by the aforementioned touch screen, or near the touch screen.

Examples of the proximity sensor 141 include a transmissive type photoelectric sensor, a direct reflective type photoelectric sensor, a mirror reflective type photoelectric sensor, a high-frequency oscillation proximity sensor, a capacitive type proximity sensor, a magnetic type proximity sensor, an infrared ray proximity sensor, and the like. When the touch screen is implemented as a capacitive type, the proximity sensor 141 can be configure to sense proximity of the object by changes of an electromagnetic field, which is responsive to an approach of an object with conductivity. In this case, the touch screen (touch sensor) itself may also be categorized as a proximity sensor.

Meanwhile, for clarity, when an object is near a touch screen without touching the touch screen, an action of making the object located on the touch screen to be recognized is referred to as "proximity touch". On the contrary, if the object is actually contacted with the touch screen, it is referred to as "contact touch". For the position corresponding to the proximity touch of the object relative to the touch screen, such position will correspond to a position where the object is perpendicular to the touch screen. The proximity sensor 141 may sense proximity touch and a proximity touch pattern (for example, proximity touch distance, proximity touch direction, proximity touch speed, proximity touch time, proximity touch position, proximity touch moving status, and the like). Meanwhile, the controller 180 processes data (information) corresponding to a proximity touch operation and a proximity touch pattern sensed by the proximity sensor 141 and may be then able to output visual information corresponding to the processed data on the touch screen. In addition, the controller 180 can control the user equipment 100 to process different operations or different data according to whether a touch touched on an identical point of the touch screen corresponds to a proximity touch or a contact touch.

A touch sensor can sense a touch (or a touch input) applied to the touch screen (or the display unit 151) using at least one selected from the group consisting of a resistive type, a capacitive type, an infrared type, and a magnetic field type.

As an example, the touch sensor can be configured to convert changes of pressure applied to a specific part of the touch screen or capacitance occurring at a specific part into an electric input signal. The touch sensor can also be configured to make a touching object sense a touched position of the touch sensor, a touched area, touch pressure and touch capacitance. In this case, the touching object corresponds to an object applying a touch on the touch sensor. For example, the touching object may correspond to a finger, a touch pen, a stylus pen, a pointer, or the like.

When a touch input is inputted on a touch sensor, a signal(s) corresponding to the touch input is transmitted to a touch controller. The touch controller processes the signal(s) and transmits corresponding data to the controller 180. Accordingly, the controller 180 may sense which region of the display unit 151 has been touched. In this case, the touch controller may correspond to a component separate from the controller 180 or the controller 180 itself.

Meanwhile, the controller 180 may execute the same or different controls according to a type of touch object that touches the touch screen (or a touch key provided in addition to the touch screen). Whether to execute the same or different control according to the type of the touch object can be determined based on a current operating state of the user equipment 100 or a currently executed application program.

Meanwhile, the touch sensor and the proximity sensor can be implemented independently, or in combination, to sense various types of touches including a short (or tap) touch, a long touch, a multi-touch, a drag touch, a flick touch, a pinch-in touch, a pinch-out touch, a swipe touch, a hovering touch and the like.

An ultrasonic sensor can recognize location information of a sensing target using ultrasonic waves. Meanwhile, the controller 180 may calculate a position of a wave generation source based on information sensed by an optical sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. More specifically, the position of the wave generation source can be calculated using the time difference from the time that the ultrasonic wave reaches the sensor based on the light as a reference signal.

Meanwhile, the camera 121, which is one of configurations of the input unit 120, includes at least one selected from the group consisting of a camera sensor (e.g., CCD, CMOS etc.), a photo sensor (or an image sensor) and a laser sensor.

The camera 121 and a laser sensor can sense a touch of a sensing target touching a 3D stereoscopic image in a manner of being combined with each other. A photo sensor can be layered on a display element. The photo sensor can be configured to scan movement of the sensing target approaching to the touch screen. More specifically, the photo sensor may include photo diodes and transistors at rows and columns to scan content on the photo sensor using an electrical signal which changes according to the quantity of light applied on the photo diodes. In particular, the photo sensor calculates the coordinates of the sensing target according to variation of light. By doing so, it is able to obtain location information of the sensing target.

The display unit 151 is configured to display (output) information processed in the user equipment 100. For example, the display unit 151 can display execution screen information of an application program executed by the user equipment 100, user interface (UI) according to the execution screen information, or graphic user interface (GUI) information.

And, the display unit 151 can be configured as a stereoscopic display unit for displaying stereoscopic images.

A 3D display scheme such as a stereoscopic scheme (a glass scheme), an auto-stereoscopic scheme (glassless scheme), a projection scheme (holographic scheme) and the like can be applied to the stereoscopic display unit.

The audio output unit 152 is configured to output audio data received from the wireless communication unit 110 or stored in the memory 170 in a call signal reception mode, a call mode, a record mode, a voice recognition mode, a broadcast reception mode, and the like. The audio output unit 152 can output an audio signal related to a particular function (e.g., a call signal reception sound, a message reception sound, etc.) performed by the user equipment 100. The audio output unit 152 can include a receiver, a speaker, a buzzer, and the like.

A haptic module 153 can be configured to generate various tactile effects capable of being felt by a user. A typical example of the tactile effects generated by the haptic module 153 corresponds to vibration. The strength, pattern and the like of the vibration generated by the haptic module 153 can be controlled by user selection or configuration of the controller. For example, the haptic module 153 may output vibrations different from each other in a manner of combining the vibrations with each other or sequentially output the vibrations.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the user equipment 100.

An optical output unit 154 can output a signal for indicating an event generation using light of a light source of the user equipment 100. Examples of events generated in the user equipment 100 may include message reception, call signal reception, a missed call, an alarm, a schedule notice, an email reception, information reception through an application, and the like.

A signal outputted by the optical output unit 154 may be implemented in a manner that the user equipment emits monochromatic light or light with a plurality of colors to the front side or a rear side of the user equipment. The signal output may be terminated as the user equipment senses that a user has checked the generated event.

The interface unit 160 plays a role of a path with all external devices connected with the user equipment 100. For example, the interface unit 160 receives data or power from an external device and delivers the data or the power to each of internal components of the user equipment 100. Or, the interface unit 160 makes internal data of the user equipment 100 to be transmitted to an external device. The interface unit 160 may include a wired or wireless headset port, an external power supply port, a wired or wireless data port, a memory card port, a port for connecting a device on which an identification module is mounted, an audio input/output (I/O) port, a video I/O port, an earphone port, and the like.

Meanwhile, the identification module corresponds to a chip in which various information for authenticating authority of using the user equipment 100 are stored. The identification module may include a user identity module (UIM), a subscriber identity module (SIM), a universal subscriber identity module (USIM), and the like. In addition, the device on which the identification module (hereinafter, 'identification device') is mounted can be manufactured in a smart card form. Accordingly, the identification device can be connected with the user equipment 100 via the interface unit 160.

When the user equipment 100 is connected with an external cradle, the interface unit 160 can serve as a path to allow power from the cradle to be supplied to the user equipment 100 or may serve as a path to allow various command signals inputted from the cradle by the user to be delivered to the user equipment 100. The various command signals or the power inputted from the cradle may operate as signals for recognizing that the user equipment 100 is properly mounted on the cradle.

The memory 170 can store programs for supporting operations of the controller 180 and temporarily store input/output data (for example, phonebook, messages, still images, videos, etc.). The memory 170 may store data on various patterns of vibrations and audio which are outputted when a touch input is inputted on the touch screen.

The memory 170 can include at least one storing means selected from the group consisting of a Flash memory type, a hard disk type, a solid state disk (SSD) type, a silicon disk (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The user equipment 100 may also be operated in relation to a web storage device that performs a storage function of the memory 170 over the Internet.

Meanwhile, as mentioned in the foregoing description, the controller 180 may control an operation related to an application program and overall operation of the user equipment 100. For example, if a condition to which a status of the user equipment is set is satisfied, the controller 180 may set or release a lock state for restricting a user from inputting a control command with respect to applications.

The controller 180 can also perform the controlling and processing associated with voice calls, data communications, video calls, and the like, or perform pattern recognition processing to recognize a handwriting input or a picture drawing input inputted on the touch screen as characters or images, respectively. In addition, the controller 180 can control one or a combination of those components in order to implement various embodiments described in the following in the user equipment 100.

The power supply unit 190 receives external power or internal power under the control of the controller 180 and supplies power required for operating respective configuration elements. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without using the connection port. In this case, the power supply unit 190 can receive power, transferred from an external wireless power transmitter, using at least one of an inductive coupling method based on magnetic induction or a magnetic resonance coupling method based on electromagnetic resonance.

Meanwhile, various embodiments described in the following may be implemented in a computer-readable medium, a machine-readable medium, or similar medium using, for example, software, hardware, or a combination thereof.

In the following, a controlling method capable of being implemented in the aforementioned user equipment and embodiments related to the controlling method are explained with reference to attached drawings. It is apparent to those skilled in the art that the present invention is modifiable into a specific form within a scope not deviated from the idea of the present invention and an essential characteristic of the present invention.

Figure 1B:
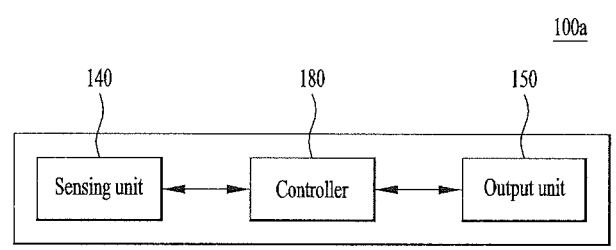
FIG. 1B is a block diagram for a notification system of a car according to one embodiment of the present invention.

FIG. 1B is a block diagram for a notification system of a car according to one embodiment of the present invention.

Referring to FIG. 1B, a car notification system 100a can include a sensing unit 140, a controller 180 and an output unit 150. The car notification system may correspond to a device or a system mounted on a vehicle. The car notification system corresponds to an independent device and can be mounted on a vehicle. Or, the car notification system may operate as a single system in a manner that each of configuration units of the car notification system 100a is installed in an appropriate position of a car and connected with each other in wired or wireless. Although the car notification system 100a is mounted on a car in a manner of being manufactured as a single device or each of the configuration units is mounted on the car in a manner of being separated from each other, the car notification system 100a can include a configuration or a characteristic to be described in the present specification. Hence, the car notification system 100a may be referred to as a terminal device.

If a touch on a door handle is sensed, the sensing unit 140 can sense an object existing within a predetermined distance in rear direction from the door on which the touch is sensed or an uncompleted function. For example, when a driver (or a passenger) parks a car and intends to get out of the car, there may exist a pedestrian moving toward the car. If the driver fails to discover the pedestrian and the pedestrian also fails to recognize the movement of the driver intending to get out of the car, an accident may occur. When the driver gets out of the car, the driver may open a door handle of the car while getting out of the car. Hence, if a touch is sensed on the door handle, the sensing unit 140 can sense whether or not an object exists within a prescribed distance in rear direction from the door on which the touch is sensed.

Or, the driver may get out of the car while failing to recognize a fact that a function of the car is not completed. For example, the driver may get out of the car without closing a window, may get out of the car without turning off the light, may leave the car without locking a door of the car or may get out of the car without terminating a wiper. The aforementioned examples are one embodiment only. The driver may get out of the car or leave the car without terminating various functions of the car. Hence, if a touch is sensed on a door handle, the sensing unit 140 can sense an uncompleted function of the car.

For example, the sensing unit 140 can include a laser sensor, an ultrasonic sensor, an image sensor, an infrared sensor and the like. The aforementioned sensors can determine an object near a car, a distance to the object, and the like. Or, the sensing unit 140 can sense whether a function of a car is turned on or off.

The output unit 150 can output a notification message corresponding to a sensed object or a sensed uncompleted function. The notification message can include a warning text, a warning image, a guideline, warning sound, notification vibration, and the like. For example, the output unit 150 can include a MEMS (micro electro mechanical systems) projector. The MEMS corresponds to a technology of manufacturing a subminiature precision machine of a size of micron (um) or millimeter (mm) in a manner that a machine/electronic structure is minutely processed by a micro-electromechanical system based on a semiconductor technology. In particular, the MEMS projector may correspond to a subminiature projector which is manufactured based on the semiconductor technology. A plurality of the MEMS projectors can be installed in the inside and the outside of a car. And, the MEMS projector may rotate. Hence, a MEMS projector installed in the front side or a MEMS projector installed in the rear side can output a notification message in left/right direction depending on a situation.

And, the output unit 150 may output sound or vibration in a manner of being implemented by a speaker, a vibration motor, or the like.

The controller 180 can control the sensing unit 140 and the output unit 150. If it is determined as a door of a car is touched and a signal sensed by the sensing unit 140 exists, the controller 180 can control the output unit 150 to output a notification message corresponding to the sensed signal.

In the following description, various embodiments for outputting a notification message are explained.

Figure 2:
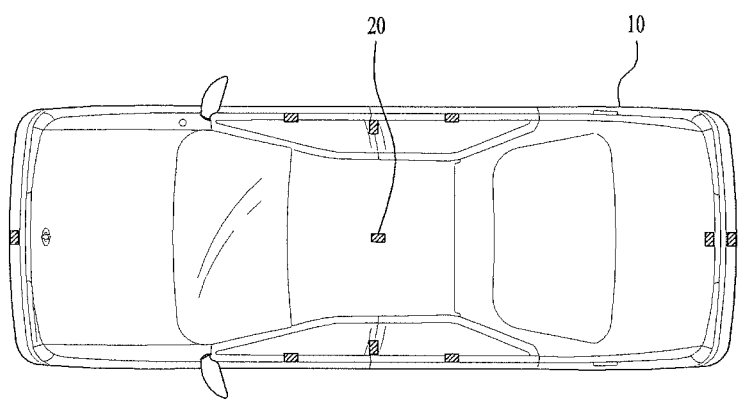
FIG. 2 is a diagram for explaining an output unit deployed in the external of a car according to one embodiment of the present invention.

FIG. 2 is a diagram for explaining an output unit deployed in the external of a car according to one embodiment of the present invention.

Referring to FIG. 2, it shows a car 10 in which a plurality of output units 20 are deployed. In one embodiment, the output unit 20 can be deployed in at least one selected from the group consisting of a front bumper, a hood part, a ceiling, a rear bumper, a trunk door part, A pillar, B pillar, C pillar, and a door part. The output unit 20 can be deployed in all or a part of the aforementioned parts.

As mentioned in the foregoing description, the output unit 20 can include a MEMS projector. The MEMS projector, which is arranged at the front side or the rear side, can output a notification message to a front, a rear, a left or a right floor. For example, if a user touches a left door, the MEMS projector can output a notification message to the left floor.

If the MEMS projector is arranged at the ceiling, the MEMS projector can output a notification message to the ceiling. If the MEMS projector is arranged at the right region of a car, the MEMS projector can output a notification message to the right floor. For example, if a touch is sensed at a door of a right front seat and an uncompleted function is sensed, a notification system can output a notification message to a front floor of a door of a front seat to make a user getting out of a car see the notification message. If a touch is sensed at a door of a right rear seat and an uncompleted function is sensed, the notification system can output a notification message to a front floor of a door of a rear seat to make a user getting out of a car see the notification message. If a touch is sensed at a door of a right front seat and an approach of an object is sensed, the notification system can output a notification message to a floor in a direction at which the object is positioned to output the notification to the object.

Meanwhile, the notification system can also output a notification message to a user positioned at the inside of a car. An embodiment of outputting a notification message at the inside of a car is described later. In the following, various embodiments of outputting a notification message are explained.

FIGS. 3A and 3B are diagrams for explaining one embodiment of outputting a notification message.

Referring to FIG. 3A, it shows the inside of a car 10. A user is riding on the car 10. The user may correspond to either a driver or a passenger. The user can get out of the car 10. The user can touch a door handle to get out of the car.

Referring to FIG. 3B, it shows a notification system outputting a notification message. The notification system can sense whether or not an object 11 exists within a predetermined distance from the car 10. Or, the notification system can also sense approaching speed of an object 11 within a predetermined distance. In one embodiment, the notification system can sense an object 11 existing within 3 m or 5 m from the car 10. Or, the notification system can sense whether or not an object 11 approaching with speed equal to or less than 5 km/h has approached within 3 m and sense whether or not an object 11 approaching with speed faster than 5 km/h and less than 30 km/h has approached within 5 m.

If the notification system senses an object 11 as a message output target and senses a touch of a user touched on a door, the notification system can output a notification message through the output unit 20. The notification message can be displayed on a front floor of an approaching object 11. In order to output the notification message while an appropriate distance is maintained with the approaching object 11, the notification system can output the notification message by rotating the output unit 20. The notification message may correspond to a warning or a notification image. And, it may be able to control color of the notification message according to a distance with the object 11. In one embodiment, the notification message may correspond to such a phrase as 'Warning'. If a distance between an object and a reference area of a car corresponds to 5 m, the notification message can be displayed in yellow color. If a distance between an object and a reference area of a car corresponds to 2 m, the notification message can be displayed in red color. For example, the reference area of the car may correspond to a touched door area, a front end or a rear end of the car. The reference area of the car and a distance with an object for outputting a notification message can be variously configured.

Figure 4B:
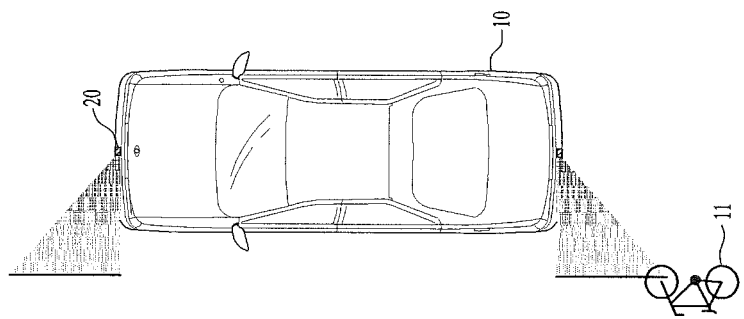
FIGS. 4A and 4B are diagrams for explaining a different embodiment of outputting a notification message.
Figure 4A:
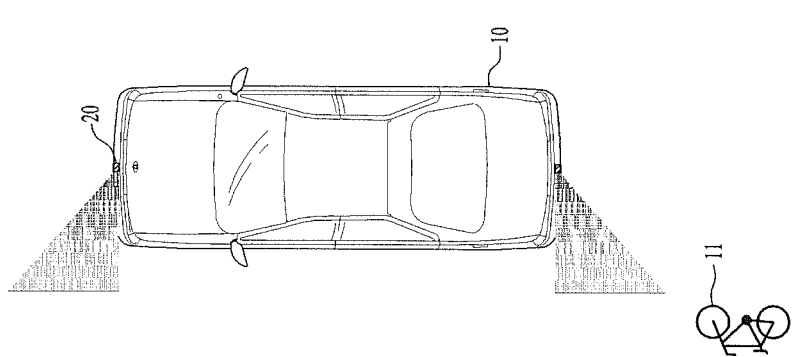

FIGS. 4A and 4B are diagrams for explaining a different embodiment of outputting a notification message.

Referring to FIG. 4A, it shows a notification system outputting a notification message of a guideline shape. As mentioned in the foregoing description, if an object 11 is sensed within a predetermined distance from a car 10 and a touch of a door is sensed, the notification system can output a notification message to an external floor.

The notification system can output a notification message of a guideline shape. The notification system can include the output unit 20 arranged at a front end and a rear end of a car. The output unit 20 can include a MEMS projector. If an approaching object is away from the car more than a predetermined distance, the notification system can output a guideline with a first color. In one embodiment, if the approaching object 11 is away from the car more than 5 m, the notification system can output a guideline with a yellow color. The notification system can output a guideline only or a guideline including a characteristic of flickering with a prescribed interval. In particular, if the object 11 is away from the car more than 5 m, the notification system can output a guideline of yellow color flickering with 1 second interval.

Referring to FIG. 4B, it shows a notification system outputting a guideline that varies according to a distance with an object 11.

As mentioned in the foregoing description, if an approaching object is away more than a first distance, a notification system can output a guideline with a first color. If the approaching object approaches within the first distance, the notification system can output the guideline with a second color. And, the notification system may increase a flickering speed.

In one embodiment, if the object 11 is away from a car more than 5 m, the notification system can output a guideline with a yellow color. In addition, the notification system may include a characteristic of flickering the guideline with an interval of 1 second. The object 11 may more approach the car. If the object 11 approaches the car within 5 m, the notification system can output a guideline with a red color. In particular, the notification system can change color of the guideline to a red color from a yellow color. And, the notification system can add a flickering characteristic to the guideline while changing color of the guideline. In particular, the notification system can add the flickering characteristic to the guideline when the guideline is changed to the red color from the yellow color which is outputted with no flickering. Or, the notification can change the flickering characteristic to an interval of 0.5 second from the 1 second interval.

In particular, if the notification system senses an object existing within a predetermined distance and a touch on a door, the notification system can output a notification message to an external floor of a door of a direction at which the object is positioned. The notification message can include a warning text, a warning image, a guideline or the like. The notification system can change a flickering speed and/or a color of the notification message based on a distance with the object.

The notification system can also output a notification message to a user positioned at the inside of a car.

Figure 5:
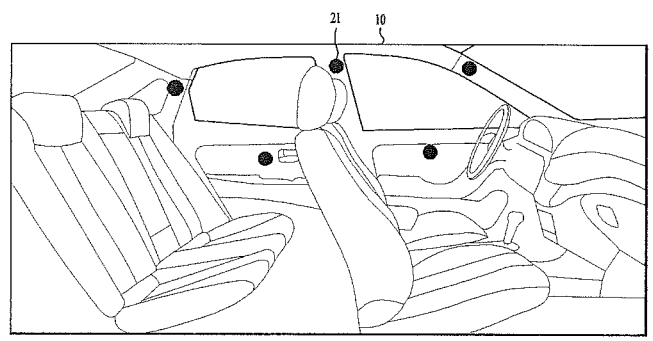
FIG. 5 is a diagram for explaining an output unit deployed in the internal of a car according to one embodiment of the present invention.

FIG. 5 is a diagram for explaining an output unit deployed in the internal of a car according to one embodiment of the present invention.

An output unit 21 of a notification system can also be installed in the inside of a car 10. As mentioned in the foregoing description, the output unit 21 can include a MEMS projector. The output unit 21 can be deployed in A pillar, B pillar, C pillar, a front door and/or a rear door. For example, the output unit 21 can be deployed in the B pillar only. Since the output unit 21 is able to rotate, when a notification message is outputted in a rear seat direction, the output unit can rotate in the rear seat direction. When a notification message is outputted in a front seat direction, the output unit can rotate in the front seat direction. Or, the output unit 21 can be deployed in the front door and the rear door. When a notification message is outputted for a user positioned at a rear seat, the notification system uses the output unit 21 deployed in the rear door. When a notification message is outputted for a user positioned at a front seat, the notification system can use the output unit 21 deployed in the front door. The output unit 21 can be installed in the inside of a car with various positions and various numbers.

And, the output unit 21 can include a speaker. The speaker can output a notification message using sound. The output unit 21 can include a warning light. The warning light can output a notification message using light. In particular, the output unit 21 of the notification system can be deployed in a door and/or a pillar of the inside of a car. If an object positioned within a prescribed distance is sensed, the notification system can output a notification message through an output unit deployed in a position closest to a door on which a touch is sensed. The output unit 21 can include a MEMS projector, a speaker and/or a warning light. The MEMS projector can output a warning message, a warning image and the like. The speaker can output a warning message using sound. The warning light can output a notification message with a lighting scheme or a flickering scheme.

Figure 6:
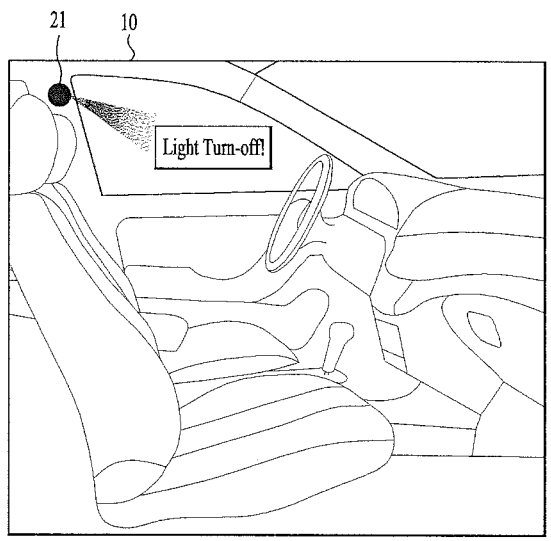
FIG. 6 is a diagram for explaining one embodiment of outputting a notification message at the inside of a car.

FIG. 6 is a diagram for explaining one embodiment of outputting a notification message at the inside of a car.

Referring to FIG. 6, it shows an embodiment that an output unit 21 including a MEMS projector outputs a notification message. In FIG. 6, the output unit 21 is deployed in a B pillar of a car 10 only. A notification system can sense an uncompleted function of the car. A user may touch a handle of a door to get out of the car. The notification system can output a notification message to the user.

In one embodiment, the notification system can sense that a headlight of a car is not turned off. A driver may touch a door without turning off the headlight. The notification system can output a notification message to the driver. The driver is positioned at a front seat and the output unit 21 is deployed in the B pillar only. In order to output the notification message to the driver positioned at the front seat, the notification system can rotate the output unit 21 in a direction of a front seat window. The notification system can output such a notification message as 'turn off headlight' to the front seat window.

If a user is positioned at a rear seat and the user positioned at the rear seat touches a door, the notification system rotates the output unit 21 in a direction of a rear seat window and can output a notification message to the rear seat window. The notification system can output a notification message not only to the inside of a car but also to an external floor of the car.

Figure 7:
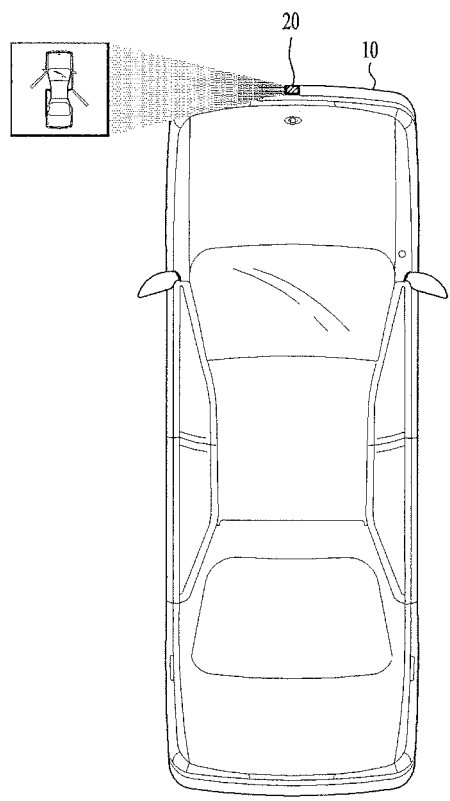
FIG. 7 is a diagram for explaining one embodiment of outputting an uncompleted function notification.

FIG. 7 is a diagram for explaining one embodiment of outputting an uncompleted function notification.

Referring to FIG. 7, it shows a notification system outputting a notification message to an external floor of a car 10. The notification system can output a notification message to the inside of the car 10. Yet, a user may get out of the car while failing to recognize the outputted notification message. Or, the notification system can output a notification message related to a door lock function only when the user gets out of the car.

The notification system can sense an uncompleted function. If a user touches a door or gets out of a car, the notification system can output a notification message related to an uncompleted function to a floor. An output unit 20 of the notification system can be deployed in a front side area, a ceiling, a rear side area and the like of a car 10. Or, the output unit 20 of the notification system can be deployed in A pillar, B pillar, C pillar and/or a door area and the like.

The notification system senses an uncompleted function of a car and senses that a user is getting out of the car. The notification system can output a notification message related to the uncompleted function to an external floor of a door of a direction in which the user is getting out. For example, the uncompleted function can include a lighting function, a door lock function and/or a window open and close function and the like. The notification message can include type information and/or location information of the uncompleted function. In one embodiment, as shown in FIG. 7, the notification system can sense that a left front door and a right rear door are not locked. If the notification system senses that the user is out of the car, the notification system can output a notification message to inform the user that the left front door and the right rear door are not locked. The notification system can output the notification message including type information (e.g., a door lock function), location information (e.g., a left front door, a right rear door) and the like of the uncompleted function to a floor.

Meanwhile, the notification system may also output a notification message in up direction.

Figure 8B:
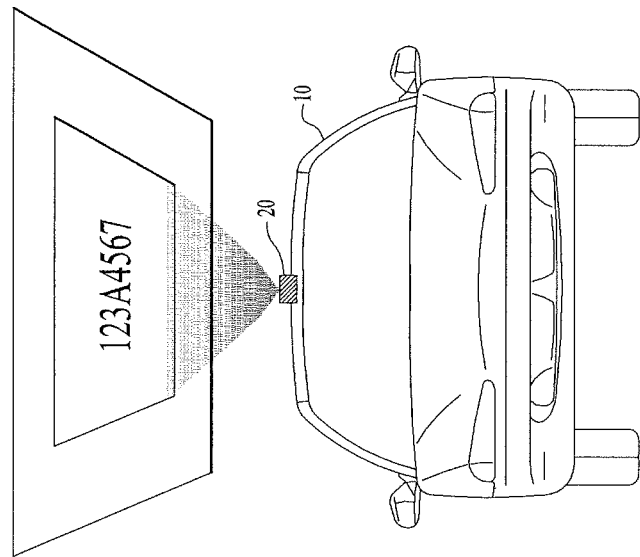
FIGS. 8A and 8B are diagrams for explaining one embodiment of outputting a car position notification.
Figure 8A:
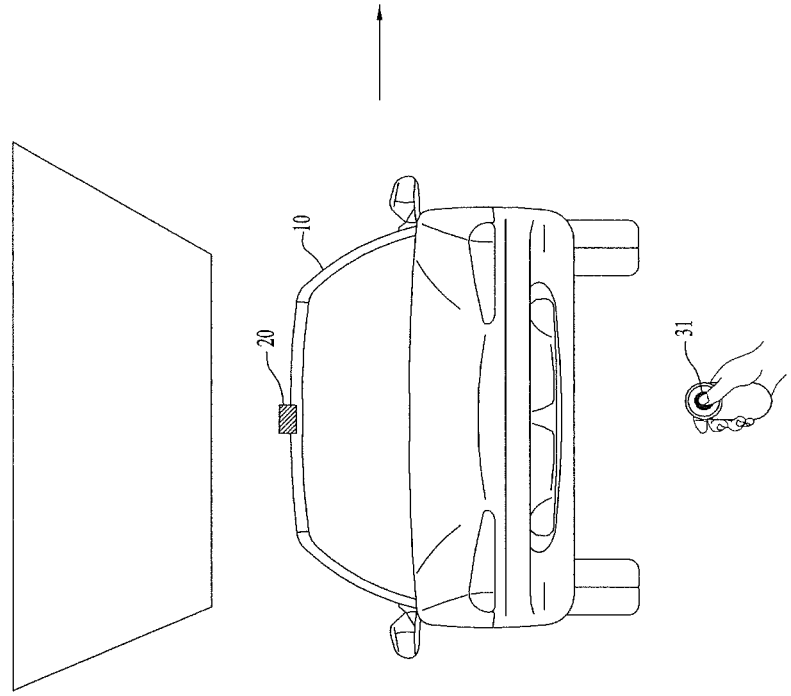

FIGS. 8A and 8B are diagrams for explaining one embodiment of outputting a car position notification.

Referring to FIG. 8A, it shows a notification system receiving a position checking signal. When a user parks a car 10 at a huge parking lot, it may be difficult for the user to find out the car of the user. An output unit 20 of the notification system can be deployed in an external ceiling area of the car 10. The output unit 20 can include a MEMS projector. The notification system receives a position checking signal from a car key 31 and may be then able to output a notification message in up direction.

The car key 31 can include a position checking function. The position checking function can be additionally included in a legacy door lock key or can be assigned to a separate key. If a position checking key is selected, the car key 31 can transmit a position checking signal to the car 10.

Referring to FIG. 8B, it shows a notification system outputting a notification message. The notification system can include a communication unit. The communication unit of the notification system can receive a position checking signal from the car key 31. Having received the position checking signal, the notification system can output a notification message through an output unit 20 deployed in an external ceiling. If a car 10 is located at indoor or is located under a structure including a roof, the outputted notification message can be outputted to a ceiling of the structure. In particular, if the notification system receives the position checking signal, the notification system can output the notification message in ceiling direction in response to the received position checking signal. A user can check the notification message projected to the ceiling of the structure. In one embodiment, the outputted notification message can include an emblem of the car 10, a number of the car 10, a phrase configured by the user, an image and the like.

Meanwhile, the notification system may also output a notification message regarding status information of a car.

Figure 9B:
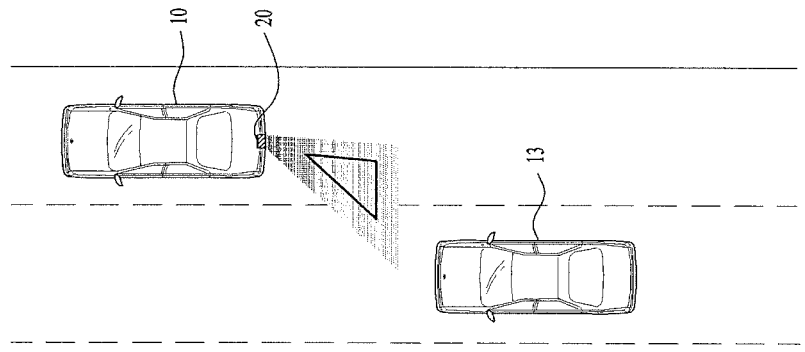
FIGS. 9A and 9B are diagrams for explaining one embodiment of outputting a car status notification.
Figure 9A:
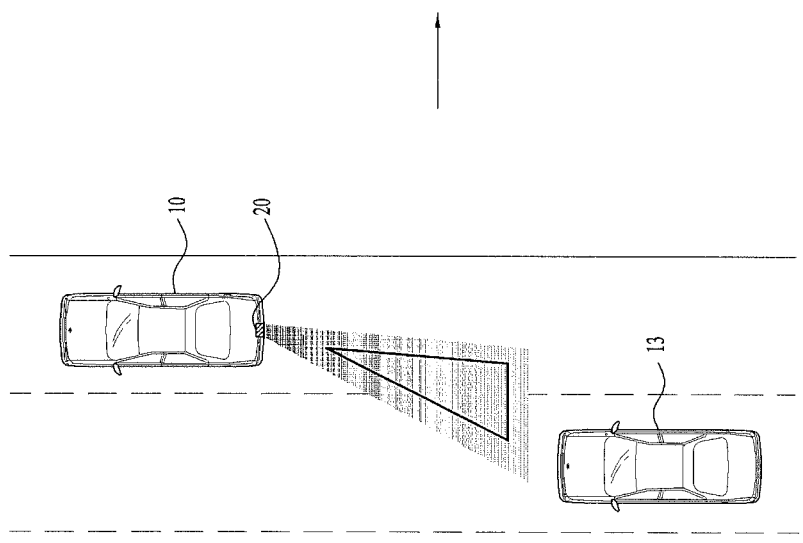

FIGS. 9A and 9B are diagrams for explaining one embodiment of outputting a car status notification.

Referring to FIG. 9A, it shows a notification system outputting a notification message regarding status information of a car 10. As mentioned in the foregoing description, the notification system can output a notification message by sensing a touch of a user. And, if an emergency signal output command is received, the notification system can output a notification message regarding a car status.

In general, if a car 10 stops on the road due to malfunction and the like, a user may push an emergency signal button. Subsequently, the user should set up a tripod at a position apart from the stopped car as much as a prescribed distance to notify the car behind. Yet, it takes time for the user to set up the tripod and a process of setting up the tripod on the road may be dangerous. Since the notification is able to immediately output status information of a car according to an inputted emergency signal output command, it is able to deliver information to the car behind and there is no dangerousness.

As shown in FIG. 9A, the notification system can output car status information according to an input of an emergency signal button. The outputted car status information may correspond to an image corresponding to an emergency signal. An output unit 20 of the notification system can be deployed in a rear bumper area or a trunk door area. For example, the outputted car status information may correspond to a triangle image. As mentioned in the foregoing description, the output unit 10 can include a MEMS projector and rotate. The notification system can project the car status information to a rear floor of the car 10. The notification system can control a position to which the car status information is projected to make a driver of an approaching car easily recognize the triangle image in a manner of sensing speed and distance of the approaching car 13. For example, if the approaching car 13 is far from the broken car 10, the notification system can output a triangle image of a shape of which two sides are stretched from a top view.

Referring to FIG. 9B, it shows a notification system outputting car status information by adjusting a shape of the information according to a distance with the approaching car 13. If a distance between the approaching car 13 and the broken car 10 is getting close, the notification system can adjust a position at which the car status information is outputted based on a distance with the approaching car 13. In particular, if the distance between the approaching car 13 and the broken car 10 is getting close, the notification system can adjust the position at which the car status information is outputted to a position close to the broken car 10. In other word, the notification system can output the car status information to the front of the approaching car 13 until the approaching car 13 approaches a prescribed distance. If the approaching car 13 is close to the broken car 10, the notification system can output a triangle image of a shape of which two sides are relatively short from a top view.

In particular, the notification system can output a notification message corresponding to an emergency signal to a rear floor of the broken car 10. If there is a car 13 approaching from the back of the broken car 10, the notification system can adjust an output position and length of the notification message based on a distance and a moving speed of the approaching car 13 to make the approaching car 13 recognize the notification message.

Figure 10:
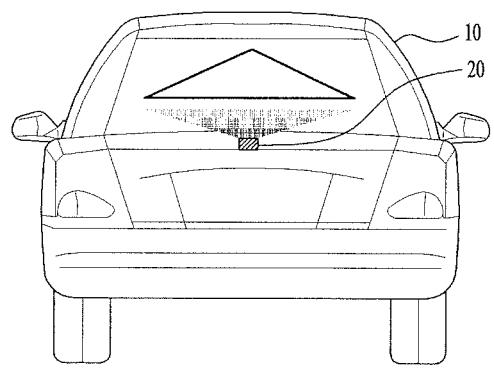
FIG. 10 is a diagram for explaining a different embodiment of outputting a car status notification.

FIG. 10 is a diagram for explaining a different embodiment of outputting a car status notification.

Referring to FIG. 10, it shows a notification system outputting a notification message to a rear glass. The notification system can output car status information according to an input of an emergency signal button. The outputted car status information may correspond to an image corresponding to an emergency signal. An output unit 20 of the notification system can be deployed in a trunk door area. The notification system can project the car status information to a rear glass of a car 10.

The notification system can assign a visual effect to the car status information projected to the rear glass of the car. For example, the outputted car status information can include a flickering function. And, the notification system can output warning sound and the car status information at the same time by including speaker in the notification system. If there exist an approaching car, the notification system may increase a volume of the warning sound, switch to warning sound of a fast pattern, increase flickering speed of the car status information or switch color of the outputted car status information in consideration of a distance with the approaching car as the distance with the approaching car is getting close.

Meanwhile, in order to make the car status information projected to the rear glass of the car to be clearly seen, the car 10 may make the rear glass to be obscure or change a characteristic of the rear glass with a specific color such as black color or the like.

Figure 11:
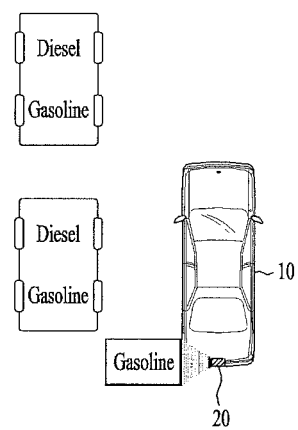
FIG. 11 is a diagram for explaining one embodiment of outputting a car characteristic notification.

FIG. 11 is a diagram for explaining one embodiment of outputting a car characteristic notification.

Referring to FIG. 11, it shows a notification system outputting a notification message regarding a car characteristic. An output unit 20 of the notification system can be deployed in C pillar, a rear door area, a trunk door area, a rear bumper and the like. In one embodiment, a car 10 may correspond to a vehicle using gasoline. The car 10 may be located in the vicinity of a lubricator for refueling. If a user selects a gas tank door opening button, a gas tank door of the car 10 is opened. The notification system can output a notification message regarding a car characteristic when the gas tank door opening button is selected. For example, the notification system can project such a message as gasoline near the gas tank door. Since an assistant of a gas station is able to check the projected message, it may be able to avoid a mistake of fueling diesel.

So far, various embodiments of the notification system have been explained. In the following a method of controlling the notification is explained.

Figure 12:
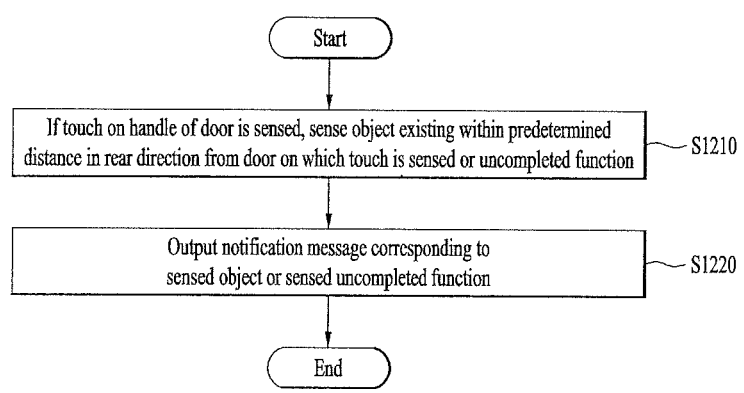
FIG. 12 is a flowchart for a method of controlling a car notification system according to one embodiment of the present invention.

FIG. 12 is a flowchart for a method of controlling a car notification system according to one embodiment of the present invention.

Referring to FIG. 12, if a touch on a door handle is sensed, the notification system can sense an object existing within a predetermined distance in rear direction from a door on which the touch is sensed or an uncompleted function [S1210]. For example, the uncompleted function can include at least one selected from the group consisting of a lighting function, a door lock function, a window opening and closing function.

The notification system can output a notification message corresponding to the sensed object or the sensed uncompleted function [S1220]. If an object existing within a predetermined distance is sensed, the notification system can output the notification message to an external floor of a door of a direction at which the object is positioned. The outputted notification message can include at least one selected from the group consisting of a warning text, a warning image and a guideline. And, the notification system can control a flickering speed of the notification message, color of the notification message or the like based on a distance with the object to make the approaching object more easily recognize the notification message.

Meanwhile, if an uncompleted function is sensed, the notification system can output a notification message to a window of a door on which a touch is sensed. And, if the notification system senses an uncompleted function and senses that a user is getting out of a car, the notification system can output a notification message to an external floor of a door of a direction in which the user is getting out. The notification message related to the uncompleted function can include at least one of type information and position information of the uncompleted function.

Various embodiments may be implemented using a machine-readable medium having instructions stored thereon for execution by a computer to perform various methods presented herein. Examples of possible machine-readable mediums include HDD(Hard Disk Drive), SSD (Solid State Disk), SDD(Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The computer may include the controller 180 of the user equipment. Hence, this description is intended to be illustrative, and not to limit the scope of the claims. The scope of the present invention should be determined by rational interpretation of the attached claims and all changes within an equivalent scope of the present invention are included in the scope of the present invention.

What is claimed is:

1. A notification system of a vehicle, the notification system comprising:
  a sensing unit configured to detect an object outside the vehicle or an operational status of a function of the vehicle;
  an output unit; and
  a controller configured to:
    determine that a touch has been detected on an interior handle of a door of the vehicle; and
    based on the determination that the touch has been detected on the interior handle of the door:
      determine that the object outside the vehicle detected by the sensing unit is within a predetermined distance in a rearward direction from the door on which the touch has been detected, or that an operational status of a function of the vehicle detected by the sensing unit indicates that the function is not yet complete; and
control the output unit to output a notification based on the determination that the detected object outside the vehicle is within the predetermined distance in the rearward direction from the door, or that the detected operational status of the function of the vehicle indicates that the function is not yet complete,
wherein the controller is further configured to, based on the determination that the detected operational status of the function of the vehicle indicates that the function is not yet complete:
control the output unit to output the notification to a window of the door on which the touch has been detected.

2. The notification system of claim 1, wherein the controller is further configured to, based on a determination that the object outside the vehicle detected by the sensing unit is within the predetermined distance in the rearward direction from the door on which the touch has been detected:
control the output unit to output the notification by projecting the notification on an area of ground adjacent to the door and towards a direction in which the object outside the vehicle is detected.

3. The notification system of claim 2, wherein the notification comprises at least one of a text, an image, or a guide line.

4. The notification system of claim 2, wherein the controller is further configured to:
determine a distance between the vehicle and the object detected outside the vehicle; and
control at least one of a flickering speed of the notification or a color of the notification based on the determined distance between the vehicle and the object.

5. The notification system of claim 1, wherein the output unit comprises at least one warning light disposed on an interior portion of the door or on an interior pillar of the vehicle, and
wherein the controller is further configured to, based on a determination that the object outside the vehicle detected by the sensing unit is within the predetermined distance in the rearward direction from the door on which the touch has been detected:
determine a warning light, from among the at least one warning light, that is disposed in a position closest to the door on which the touch has been detected; and
activate the warning light that is disposed in the position closest to the door on which the touch has been detected.

6. The notification system of claim 1, wherein the controller is further configured to, based on a determination that the detected operational status of the function of the vehicle indicates that the function is not yet complete:
determine that a user exiting the vehicle has been detected; and
based on the determination that the user exiting the vehicle has been detected, control the output unit to output the notification by projecting the notification on an area of ground adjacent to the door and towards a direction in which the user is detected to be exiting the vehicle.

7. The notification system of claim 6, wherein the notification indicates at least one of a type of the function that has been detected to be not yet complete or a location of the function that has been detected to be not yet complete.

8. The notification system of claim 1, wherein the function that has been detected to be not yet complete comprises at least one of a lighting function of the vehicle, a door lock function of the vehicle, or a window opening and closing function of the vehicle.

9. The notification system of claim 1, further comprising a communication unit configured to receive a signal from a car key,
wherein the controller is further configured to:
determine that the received signal corresponds to a request for providing information on a position of the vehicle; and
based on the determination that the received signal corresponds to the request for providing information on a position of the vehicle, control the output unit to output the notification for providing the information on the position of the vehicle by projecting the notification in an upward direction above the vehicle.

10. The notification system of claim 9, wherein the notification comprises at least one of an emblem associated with the vehicle, a number associated with the vehicle, a user-defined text, or a user-defined image.

11. The notification system of claim 1, further comprising an input unit configured to receive an input,
wherein the controller is further configured to:
determine that the received input indicates an emergency; and
based on the determination that the received input indicates the emergency, control the output unit to output the notification corresponding to the emergency.

12. The notification system of claim 11, wherein the controller is configured to control the output unit to output the notification to a rear window of the vehicle or to project the notification on an area of ground at a rear of the vehicle.

13. The notification system of claim 11, wherein the controller is configured to control the output unit to output the notification by projecting the notification on the area of ground at the rear of the vehicle, and
wherein the controller is further configured to:
determine that the object is approaching from a rearward direction of the vehicle;
determine a distance and a speed of the object approaching from the rearward direction of the vehicle; and
adjust an output position and a size of the projected notification based on the distance and the speed of the object approaching from the rearward direction of the vehicle.

14. The notification system of claim 1, wherein the output unit comprises a Micro Electro Mechanical Systems (MEMS) projector.

15. The notification system of claim 1, wherein the output unit is configured to rotate.

16. A method of controlling a notification system of a vehicle, the method comprising:
determining that a touch has been detected on an interior handle of a door of the vehicle; and
based on the determination that the touch has been detected on the interior handle of the door:
determining that an object outside the vehicle is within a predetermined distance in a rearward direction from the door on which the touch has been detected, or that an operational status of a function of the vehicle indicates that the function is not yet complete; and outputting a notification based on the determination that the detected object outside the vehicle is within the predetermined distance in the rearward direction from the door, or that the detected operational status of the function of the vehicle indicates that the function is not yet complete, wherein outputting a notification further comprises:
based on the determination that the detected operational status of the function of the vehicle indicates that the function is not yet complete, outputting the notification to a window of the door on which the touch has been detected.

* * * * *